Figure 1:
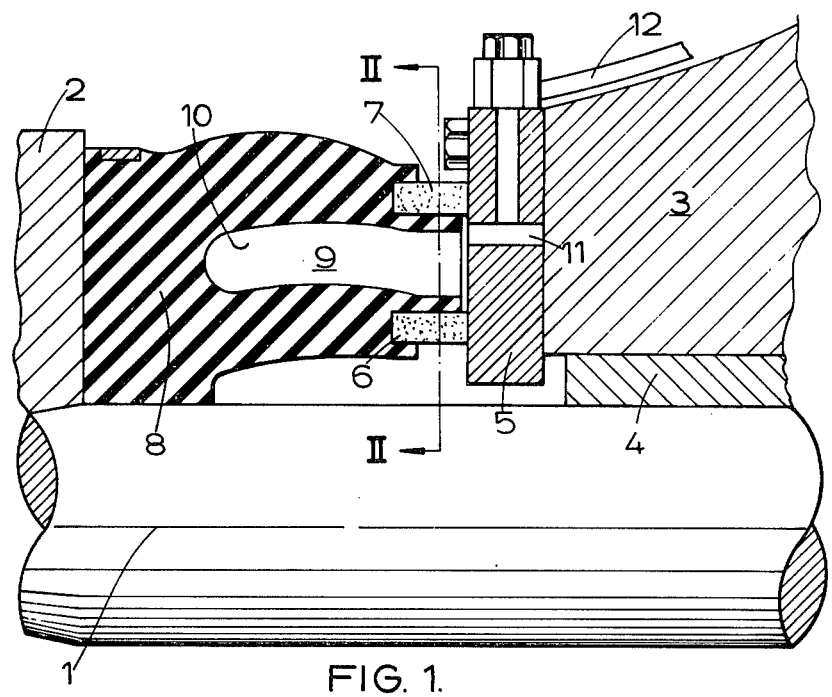

United States Patent [19]
Wilkinson

[11] 4,445,695
[45] May 1, 1984

[54] ROTARY MECHANICAL SEALS

[75] Inventor: Samuel C. Wilkinson, Chichester, England

[73] Assignee: Crane Packing Limited, Slough, England

[21] Appl. No.: 380,467

[22] Filed: May 20, 1982

[30] Foreign Application Priority Data

Mar. 10, 1982 [GB] United Kingdom ................ 8207021

[51] Int. Cl.³ .............................................. F16J 15/34
[52] U.S. Cl. ...................................... 277/65; 277/96.1
[58] Field of Search ...................... 277/65, 81 R, 96 R, 277/96.1

[56] References Cited

U.S. PATENT DOCUMENTS 2,919,148 12/1959 Smith .................................... 277/65
3,362,718 1/1968 Little .................................... 277/65

Primary Examiner—Robert I. Smith
Attorney, Agent, or Firm—Scrivener, Clarke, Scrivener and Johnson

[57] ABSTRACT

A seal assembly primarily for use with the stern bearing of a ship comprises inner and outer face seal elements mounted on a rubber body for rotation with the propeller shaft. Any oil from the bearing which leaks past the inner element, or sea water which leaks past the outer element, enters a void space formed by pockets in the rubber body. These pockets are separated by inclined vanes which act as a centrifugal pump to expel the leakage material through a passage in a seat for the seals. The assembly can also be used in other applications where the leakage material is corrosive or is likely to cause blockages.

7 Claims, 2 Drawing Figures

ROTARY MECHANICAL SEALS

This invention relates to a rotary mechanical seals, in particular face seals, which are suitable for use in the stern bearing of a ship and in other similar situations where the seal acts to keep apart two fluids and it is imperative that one fluid cannot escape past the seal to contaminate the other, e.g. contamination of the sea by oil from the stern bearing. Other examples of such situations are those where the seal is holding back a poisonous or corrosive liquid, requiring special precautions to eliminate the possibility of escape.

In the case of stern shaft seals for ships, numerous designs exist, based on the concept of two seals spaced apart at the outboard end of the bearing, one excluding the sea-water and other holding back the oil in the bearing, with provision for a drain between the two to drain off anything that passes either seal, whether it be oil or sea water. When functioning well, such an arrangement does virtually eliminate the possibility of sea-water reaching the bearing, and of oil from the bearing escaping into the sea, but in many cases the drains have to be provided through rather small pipes in order to bring them into the hull of the ship, and these are prone to becoming choked with minor debris, corrosion by-products, grease or solidified oil, thus limiting or nullifying the effectiveness of the system.

Although it is known to provide fluid pumps in association with various kinds of rotary seals, these pumps are designed to handle lubricants or cooling fluids which have good lubrication properties. In the case of stern shaft seals the leakage product is likely to be a mixture of salt water, oil and solid debris such as sand, which can cause severe problems of corrosion and blockage of the pumping gear. For this reason all the known stern shaft seal designs rely on a gravity drain, which means that the drainage pipe has to be provided with a suitable fall to ensure flow. This in turn gives rise to the almost insurmountable problem of making holes through the stern frame to accommodate the pipe.

The aim of the invention is to provide a form of seal assembly which is suitable for use with the stern bearing of a ship, or in similar situations where the leakage material is corrosive or is likely to cause blockages, and which does not have to rely on a gravity drain.

The invention provides a rotary mechanical seal assembly for keeping apart two fluids and through which a rotatable body such as a shaft passes, comprising two separate face seals spaced apart axially or radially with an annular void space between them leading to a drain passage, and a part which is associated with the rotatable body and carries within the void space a formation which on rotation acts to pump to the drain passage any fluid entering that space.

It has been found that by using a rotatable pumping formation located in the void space itself it is possible to clear even the most difficult leakage products. Furthermore, since the pumping arrangement does not require high precision parts the effects of corrosion can be minimised. Also, because of the positive pumping pressure which is generated, the leakage fluid can be conducted away from the seal area through a considerable length of piping, without regard to its rise or fall and regardless of reasonable restrictions on its diameter.

The pumping formation may take the form of a helical scroll acting as a screw to carry away the leakage product, but preferably the pumping formation is designed to act as a centrifugal pump causing the mass of material in the void space to be carried around at the speed of the rotatable body and expelled from the space by centrifugal force. In this way the void space can be purged virtually completely, thus substantially reducing the long-term effects of corrosion in this area. A further advantage of such an arrangement is that the pumping formation acts as a centrifugal separator so that liquid of greater specific gravity is flung to the outside and leaves the void space first. Thus, if, for example, there is heavy leakage of water into the space, the leakage will be clearly evident at the drain. This indication, well in advance of the leakage becoming unacceptable, gives a warning of the need for repair work in plenty of time to be planned with minimum interference to the operation of the ship, or whatever else the seal is used in.

In a preferred arrangement the pumping formation comprises a number of vanes or blades dividing the void space into separate compartments. These vanes or blades may extend radially or, better still, spirally in such a way that they are outwardly inclined away from the intended direction of rotation of the rotatable body. This aids expulsion of anything entering the void space by guiding the contaminating material to the outer regions of the space.

Preferably both face seals are carried on a common mounting member which rotates with the rotatable body, and the vanes are formed by pockets in that member. The two face seals are preferably spaced apart radially with the drain passage opening into the void space adjacent to the outer face seal.

Figure 2:
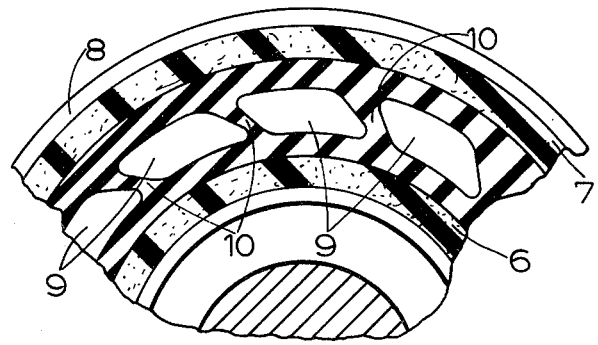

An embodiment of the invention will now be described by way of example with reference to the accompanying drawings in which:

FIG. 1 shows a longitudinal section through a ship's stern shaft seal assembly, and FIG. 2 shows a transverse section II—II through the seal assembly.

A propeller shaft 1 carrying a propeller boss 2 is located within the stern frame 3 of a ship in a bearing 4, which is flooded with oil. A stationary wearing ring or seat 5 is secured to the end of the stern frame 3 in contact with concentric inner and outer rotating radial face seal elements 6 and 7, which are held resiliently against the ring 5 by a mounting member comprising an annular moulded rubber body 8 into which they are bonded. The body 8 bears against the propeller boss 2 and rotates with it, the axial spacing between the boss 2 and the ring 5 being such that the body 8 is permanently under axial compression to maintain the load on the elements 6 and 7.

Moulded into the rubber body 8 is a ring of circumferentially spaced pockets 9 defined by web-like membranes 10 (FIG. 2) which extend spirally outwards from the shaft away from the direction of rotation, and form pumping vanes or blades. These vanes extend axially between the elements 6 and 7 to make light rubbing contact with the surface of the seat 5.

It will be seen, therefore, that any sea water which penetrates inwards from outside past the seal 7 will enter the pockets 9 and will be subject to centrifugal force which will eject it through a passage 11 which opens into the void space adjacent to the outer face seal 7. The passage conveys the ejected material through the wearing ring 5 to a drain pipe 12 which is external to the hull of the ship. The same will happen to any oil from the bearing 4 that leaks past the seal 6. A simple settling device at the drain will give visual evidence of the proportion of leakage of each fluid.

The system would be equally effective in pumping leakage fluid through any communicating passage into the hull regardless of reasonable restrictions and regardless of its rise or fall.

It is possible that the seat could be rotating and the seal elements stationary, in which case the vanes would be in the form of fins attached to the seat. Also, the face seal elements could be spaced apart axially instead of radially.

I claim:

1. A rotary mechanical seal assembly for keeping apart two fluids comprising a rotatable shaft, a seat member and a mounting member both surrounding said shaft, said mounting member carrying a pair of spaced apart face seals in rubbing contact with said seat member and defining between them an annular void space, one of said seat and mounting members being rotatable with said shaft and the other of said members being stationary with respect to said shaft, passage means in one of said members defining a drain passage leading into said void space, and pumping means rotatable with the shaft to pump to said drain passage any fluid which enters said void space.

2. A seal assembly according to claim 1, in which the pumping means comprises a plurality of vanes dividing the void space into separate compartments and arranged to act as a centrifugal pump upon rotation of said shaft.

3. A seal assembly according to claim 2, in which the vanes are outwardly inclined away from the intended direction of rotation of the shaft.

4. A seal assembly according to claim 1, wherein said mounting member is mounted for rotation with said shaft.

5. A seal assembly according to claim 4, in which the pumping means comprises a plurality of vanes defined by pockets in said mounting member.

6. A seal assembly according to claim 4, wherein said seat member is stationary and in which the drain passage opens into the void space through the seat member between the two seals.

7. A seal assembly according to claim 6, in which the two face seals are spaced apart radially of the shaft and the drain passage opens into the void space adjacent to the radially outer face seal.

* * * * *